Jan. 25, 1966    L. F. PITHER    3,231,357
DISCHARGE APPARATUS FOR REFINING MOLTEN GLASS
Filed May 21, 1962    3 Sheets-Sheet 1

INVENTOR.
LESLIE F. PITHER
BY E. J. Holler &
W. A. Schaich
ATTORNEYS

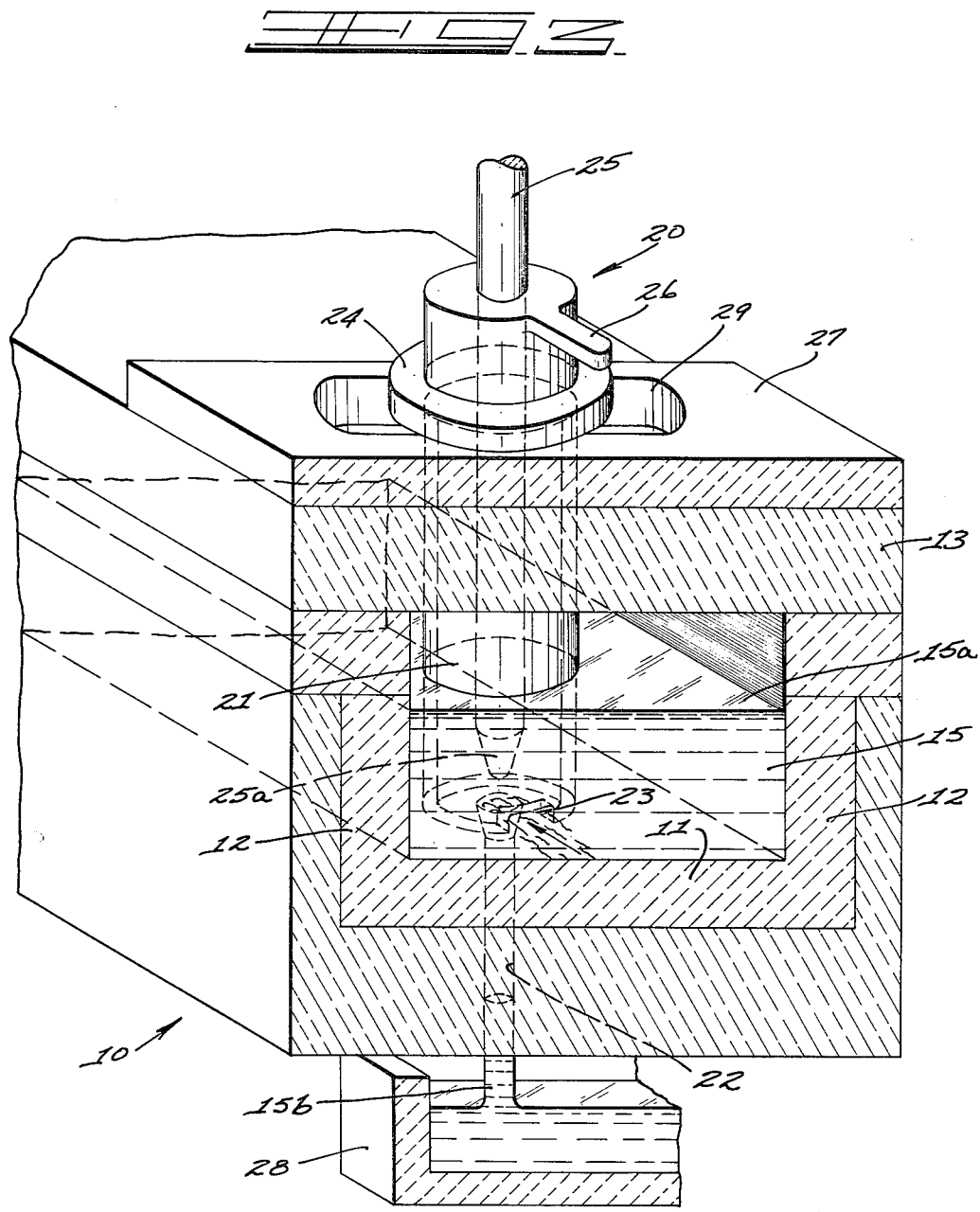

Jan. 25, 1966        L. F. PITHER        3,231,357
DISCHARGE APPARATUS FOR REFINING MOLTEN GLASS
Filed May 21, 1962        3 Sheets-Sheet 3
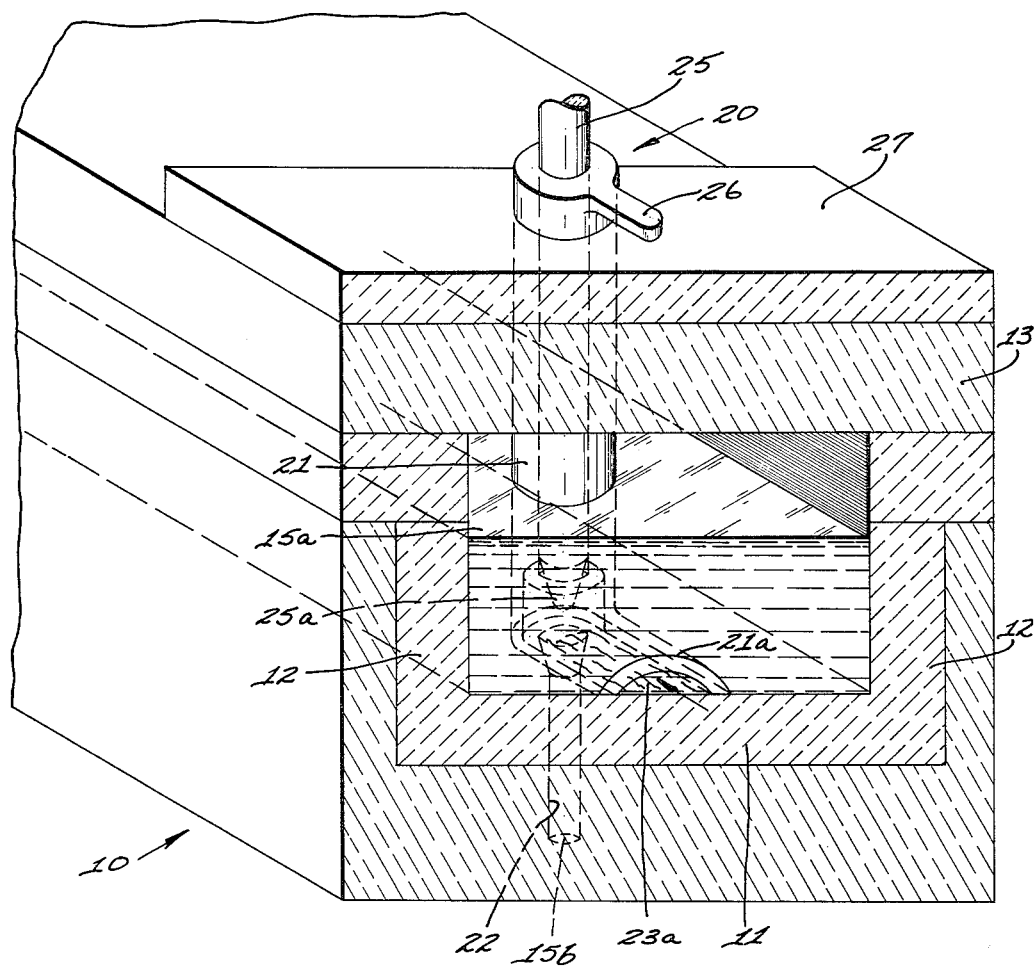
INVENTOR.
LESLIE F. PITHER
BY E. J. Holler &
W. A. Schaich
ATTORNEYS

United States Patent Office 3,231,357
Patented Jan. 25, 1966

3,231,357
DISCHARGE APPARATUS FOR REFINING MOLTEN GLASS
Leslie F. Pither, Maumee, Ohio, assignor, by mesne assignments, to Owens-Illinois Glass Company, Toledo, Ohio, a corporation of Ohio
Filed May 21, 1962, Ser. No. 196,275
6 Claims. (Cl. 65—325)

The present invention relates to improvements in glass furnaces and more particularly to methods and apparatus for refining molten glass during its continuous flow through a forehearth channel from a continuous tank furnace to supply glass forming machines.

In continuous installations for the manufacture of glass in continuous tanks, glass-producing materials are melted in one end of a tank furnace and the molten glass flows slowly through the refining portion of the furnace into a shallower receptacle or forehearth at the delivery end of of the furnace. The glass is conveyed horizontally through the forehearth to a point of use. The glass is continually heated and conditioned during its travel through the forehearth and the greater portion of the conveyed glass consists essentially of surface flow. The lower strata of the glass in the bottom of the forehearth exhibits slight movement and is relatively stagnant in comparison with the more fluid upper strata. Thus, the upper surface portion of the glass which is highly heated is rendered very fluid compared with the relatively heavy viscous glass disposed in the bottom and along the sidewalls of the forehearth.

Due to such uneven heating some portions of the glass remain in the forehearth for excessively long periods of time and due to the relative inactivity of the lower glass strata, the producing capacity of the tank is limited essentially to the volume of forehearth surface flow. The inactive glass in the forehearth bottom exhibits a further deficiency in that substantially all impurities or contaminants such as stones, cords, stria, blisters and the like are formed and collect therewithin and periodically are carried into the main stream of glass. These impurities and contaminants adversely affect the quality of glass drawn for forming.

During the conveyance of molten glass forwardly to the delivery orifice of a feeder through a refractory forehearth objectionable poor quality glass tends to collect along the forehearth bottom and adjacent its sidewalls as stated and these impurities may be scattered across its entire width. Should this relatively poor quality glass find its way into articles of optical quality such as cathode-ray television picture tube face plates fabricated by press molding, this glass causes visual defects such as cords, stones, blisters, smears or other defects in the viewing portion of the panel which are intolerable. The border portions of the molten glass within the forehearth adjacent the bottom and sidewalls do not flow as rapidly as the central portion thereof chiefly due to resistance to flow offered by such surfaces. Further, the glass adjacent thereto is somewhat cooler due to dissipation of heat through the bottom and sidewalls. Since uniform temperatures frequently cannot be maintained through the width and depth of the molten glass within the forehearth over lengthy periods of time, heavy-density glass containing the aforementioned inhomogeneities tends to collect in the forehearth bottom predominantly at one side or the other which is occasionally drawn into the main stream of glass causing defects in the final articles. Such objectionable glass cannot be tolerated in producing high-quality glassware.

Accordingly, it is an object of this invention to eliminate the above-stated objectionable features in a forehearth whereby poor quality glass or that containing the principal impurities is separated from the better glass during its conveyance in such manner that only the very best quality glass is allowed to pass into the final articles produced.

Another object of this invention is to avoid the inclusion of objectionable portions of molten glass by an improved conveying structure and method of conveying to effect separation and concentration of undesirable portions of the glass to improve the quality and increase the quantity of usable glass passed therethrough.

Another object of this invention is to provide an improved method of refining glass.

Another object of this invention is to provide a forehearth structure which is particularly adapted to concentration and separation of objectionable heavy density glass from high quality glass during its conveyance through an intermediate area of the forehearth.

A further object of the invention is the provision of method and apparatus to eliminate the formation of stagnant objectionable bottom glass which creates a drag on the edges or border portions of the main stream of glass being conveyed within a forehearth.

The specific nature of this invention, as well as other objects and advantages will become apparent to those skilled in the art from the following detailed description taken in conjunction with the annexed sheets of drawings on which, by way of preferred example only, are illustrated the preferred embodiments of the invention.

On the accompanying drawings:

FIG. 3 is an enlarged vertical sectional view in partial perspective of the forehearth taken along the line 3—3 of FIG. 1; and FIG. 4 is a view similar to FIG. 3 showing a modified embodiment of the invention.

Figure 1:
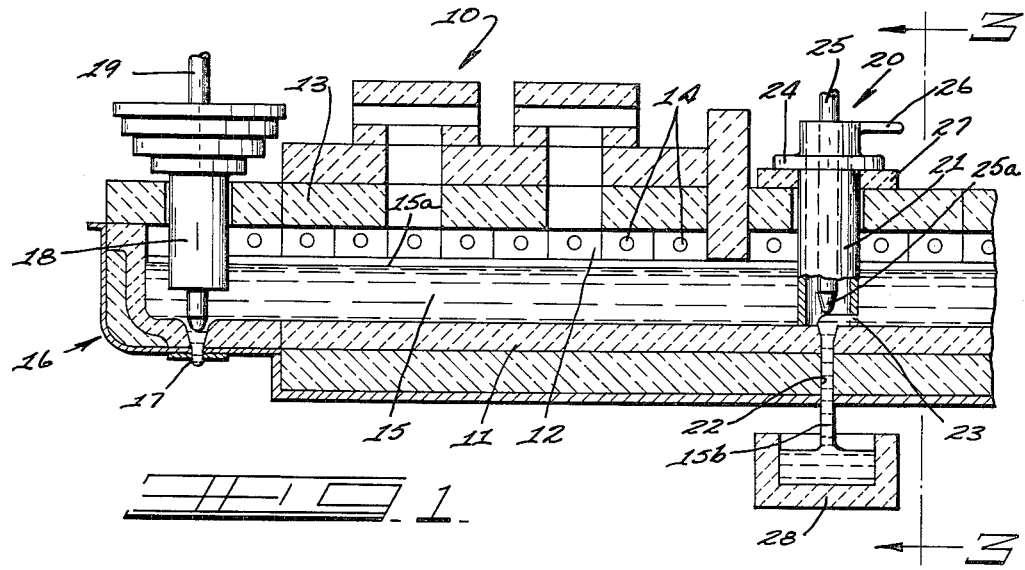
FIG. 1 is a longitudinal vertical sectional view of a glass conveying forehearth embodying principles of the present invention.

Constituents which comprise the glass batch are melted and refined in a tank furnace and the melted glass flows from the furnace through an outlet in the wall of the refiner portion thereof into the forehearth 10. The glass 15 may be further refined and its temperature regulated in a conventional manner as the glass flows through the forehearth 10 to the feeder outlet 16. The glass level within the forehearth extends essentially horizontally as shown.

Forehearth 10 is comprised of a horizontal bottom 11, vertical sides 12, and a roof 13. A series of gas-fired burners 14 are disposed in spaced-apart alignment in the forehearth side walls 12 to maintain the glass 15 in proper fluid condition during its travel through the forehearth from the melting tank to the feeder outlet. The foregoing elements of the forehearth are conventional in nature and may be varied as desired. Ordinarily, the forehearth elements are fabricated of heat-resistant material such as a plurality of cast refractory blocks.

In the present invention the flow of molten glass through the forehearth is controlled either by heating the glass upon its upper surface only or through the side and bottom walls of the forehearth as by submerged electrodes. Also various combinations thereof can be employed to maintain the glass stream at the desired temperature and viscosity.

The stream of glass 15 is of substantially the same viscosity upon entering the forehearth although has a practical matter some segregation and separation of the glass into more fluid less dense upper, and less fluid more dense lower portions tends to occur as the glass moves along through the forehearth comprised of cast refractory blocks.

During the period when the glass is conveyed through the forehearth to the feeder orifice 17, varied amounts of deleterious segregation into upper and lower strata ordinarily occurs. The glass which is delivered to the feeder is discharged from orifice 17 above which is mounted a rotary sleeve 18 and a vertically reciprocatable plunger 19, the latter being in alignment with the delivery orifice. The issuing glass is severed into successive mold charges such as by a pair of glass cutting shears.

In accordance with the present invention refining means designated by the numeral 20 is located within an intermediate area of the forehearth. A tubular element 21 is mounted in upright relation within the forehearth channel. Tubular element 21 is preferably comprised of a right-cylindrical tube having a uniform diameter with a substantially planar lower edge surface. The lower edge of tubular element 21 rests on or is positioned closely adjacent the upper surface of the forehearth bottom. The upper end of tubular element 21 projects exteriorly above forehearth roof 13.

Figure 2:
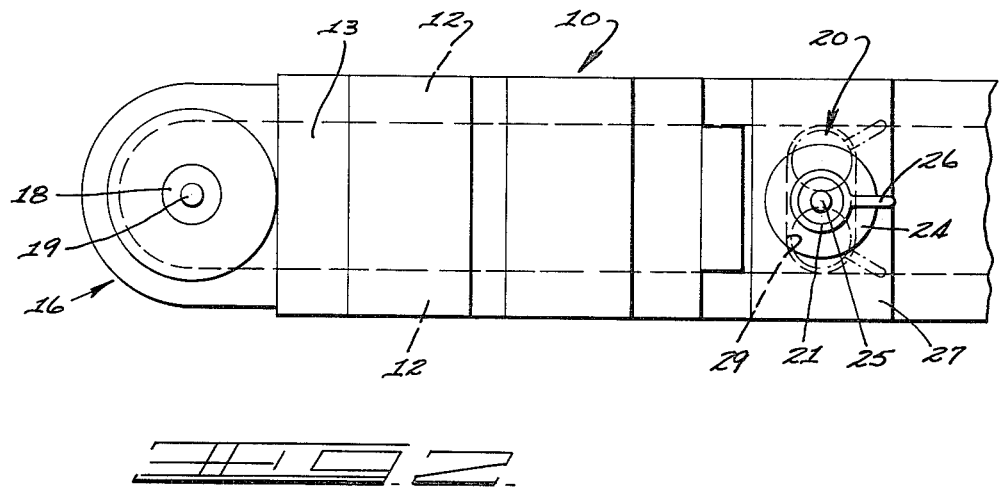
FIG. 2 is a plan view of the forehearth shown in FIG. 1.

A discharge passage 22 consisting of a vertical drain is disposed within a central intermediate region of forehearth bottom 11. Tubular member 21 is mounted in vertical alignment with discharge passage 22 to surround the same. Tubular element 21 has a radial slot 23 in a localized region of its lower end portion for conducting a selected portion of the bottom strata of molten glass 15 within the lower end of this element. Tubular element 21 is maintained in vertical alignment by an annular support member 24 which rests on a flat plate or block 27 mounted on forehearth roof 13. A handle or lever 26 is attached to an upper end of tubular element 21 to facilitate turning the element axially to align radial slot 23 with a prescribed region of the forehearth bottom. Normally slot or opening 23 faces upstream disposed either directly parallel to the axis of the forehearth channel or directed at an angle toward either side thereof. A lengthy plug member 25 having a tapered lower end 25a is mounted within tubular element 21 for controlling the egress of objectionable bottom glass 15b through discharge passage or drain 22. Rectangular plate 27 which is mounted in horizontal relation on forehearth roof 13 has an elongated slot 29 therein to facilitate movement of tubular element 21 laterally across the forehearth channel from one side to the other. As shown in FIG. 2 tubular element 21 may be mounted in a medial area of the channel as shown in solid lines or at either side thereof as shown in broken lines.

Tubular element 21 has a diameter substantially greater than discharge passage 22 and substantially less than the width of the channel bottom. Thus with tube 21 positioned in upright relation with its bottom edge in physical contact with the forehearth bottom good quality glass is permitted to pass on both sides thereof when it is mounted in a medial region of the forehearth.

Observations of forehearth operation indicate that objectionable low quality bottom glass normally collects and is conveyed along in a lineal path at a prescribed localized region of the channel. Tubular element 21 is positioned with its bottom slot 23 facing the maximum concentration of such low quality glass for its conductance exteriorly of the channel through the bottom drain 22. The objectionable bottom glass is thus separated and concentrated over the drain as it is collected by the collection tube. Controlling the amount of glass withdrawal through the drain is achieved by vertical adjustment of plug element 25. Only a small quantity of good quality glass is discharged downwardly through the drain.

As shown in FIG. 3 radial slot 23 faces upstream toward a medial bottom portion of the conveyed glass. The objectionable bottom glass 15b is conducted horizontally through radial slot 23 over and downwardly through discharge passage 22 into a collection receptacle 28. Objectionable glass 15b may be further refined or utilized for another purpose as desired.

In a modified form of the invention as shown in FIG. 4 the lower end of tubular element 21 has a horizontally projecting lower portion 21a having the shape of a cylindrical segment. Portion 21a is hollow and concavo-convexly shaped in section having a substantially planar lower edge which rests upon the forehearth bottom 11. Angular movement of handle 26 exteriorly of the forehearth permits movement of hollow horizontal projection 21a either angularly or directly upstream to gather the objectionable bottom glass 15b. This low quality glass is conducted horizontally by arcuately-shaped horizontal extension 21a into a lower region of tube 21 over and through discharge passage 22. In this case, tubular element 21 may be stationarily aligned in upright relation within a medial area of the forehearth or if desired, it may be shifted laterally normal to the forehearth longitudinal axis.

The present method of refining molten glass during its conveyance through a forehearth channel may be summarized as follows:

The molten glass stream is caused to flow in a horizontal direction through the channel while it is maintained at an elevated working temperature by suitable heating elements. At an intermediate area of the channel selective separation of the heavy-density lower portion of the stream is effected. The separated lower portion is caused to flow horizontally to a localized region of the channel over a discharge passage or drain. The objectionable lower portion of the stream is then conducted downwardly through the passage exteriorly of the forehearth channel. A gating element such as a vertically adjustable lengthy plug element is utilized to control egress of the objectionable lower portion of the glass stream.

Glass that passes beyond tubular element 21 and associated drain 22 is essentially free from the non-homogeneous types of defects such as can and do occur when all of the glass passes through the forehearth to the feeder orifice. The combined upright tubular element and associated drain serve to collect and concentrate the bottom stria of cold and cordy glass and a major portion of the stones and blisters which are most prevalent along the forehearth bottom traveling in a restricted path due to normal flow patterns. In the hydraulics of glass flow in a forehearth channel, horizontal flow can be controlled more easily than vertical flow. By controlling the amount of glass removed through the bottom drain and properly conditioning the glass conveyed therebeyond wide latitude of working limits, temperature and viscosity of the glass is achieved.

The amount of glass which is removed through the bottom drain is dependent upon the amount of cordy, streaked or other defect-bearing portions of the glass stream as evidenced by the ware produced. As more defects attributable to cordy streaks and stones, for example, are evident in the ware, more glass is removed through the tubular element and associated drain from the main body portion of glass. The plug element is raised to open the drain further. The removed glass may or may not be reused depending upon its particular characteristics.

The present invention has a considerable value in melting and refining all common types of commercial glasses and is of particular value in further refining glasses for electronic use such as in press-forming face plate members of cathode-ray image tubes. The invention is readily adapted to use in existing forehearths without extensive modifications thereto and the elements hereof have minimal moving parts requiring service and maintenance.

It is contemplated that tubular element 21 be fabricated of high-temperature resistant refractory material which may or may not be coated with noble metal or noble metal alloy at least over its submerged glass-contacting portion. Also this element can be fabricated of noble metal or noble metal alloy such as platinum-rhodium alloy to resist prolonged exposure to the conveyed molten glass stream without deformation or destruction. Further, the plug element 25 and discharge passage 22 can also be covered with or comprised essentially of precious metal or similar alloys resistant to long-term exposure to molten glass.

Various modifications may be resorted to within the spirit and scope of the appended claims.

I claim:

1. In combination with a glass melting and refining tank, a forehearth extending horizontally therefrom providing a substantially level-bottomed channel through which the molten glass from the melting and refining tank flows continuously forwardly to a delivery orifice, means adapted to heating the glass within said channel to maintain the same at an elevated working temperature, the improvement comprising a hollow tubular element mounted in upright relation within an intermediate area of said channel with its lower end closely adjacent the horizontal channel bottom and its upper end projecting exteriorly above said forehearth, a discharge passage located in said channel bottom in vertical alignment with the lower end of said tubular element, a peripheral opening formed in a localized region of the lower end portion of said tubular element to conduct a heavy-density lower portion of said molten glass to said discharge passage, and means for moving said tubular element both axially about its longitudinal axis and laterally with respect to said channel to align its peripheral opening in stationary relation with a prescribed area of said channel.

2. A forehearth for conveying and refining molten glass comprising, in combination, a refractory channel having lengthy essentially smooth bottom and sidewalls for retaining and conducting the molten glass to a point of use, heating means for controlling the temperature of said molten glass within said forehearth, at least one hollow tubular element mounted in upright relation within an intermediate area of said forehearth, said tubular element being in contact with the channel bottom and projecting exteriorly above said forehearth, at least one horizontal passage disposed in close proximity to the lower end portion of said tubular element for conducting objectionable bottom glass interiorly thereof, a discharge passage disposed in the bottom of said channel with its upper end surrounded by the lower end portion of said tubular element, and means for moving said tubular element both rotatively about its longitudinal axis and laterally with respect to said channel to align and fix its horizontal passage with respect to a selected localized region of said channel.

3. The forehearth in accordance with claim 2, including a plug element mounted within said tubular element and supported from above for controlling the opening of said channel discharge passage.

4. The forehearth in accordance with claim 2, wherein said horizontal passage in the lower end portion of said tubular element comprises a radial slot formed adjacent its terminating lower edge.

5. The forehearth in accordance with claim 2, wherein said tubular element is right-cylindrical in shape having a diameter substantially greater than the discharge passage in said channel bottom and substantially less than the width of said channel.

6. The forehearth in accordance with claim 2, wherein said tubular element is comprised of refractory material with a substantially planar lower edge contacting the channel bottom surrounding said channel discharge passage.

References Cited by the Examiner

UNITED STATES PATENTS

| | | | |
|---|---|---|---|
| 2,050,211 | 8/1936 | Honiss | 65—168 |
| 2,093,374 | 9/1937 | Wadsworth | 65—131 |
| 2,470,558 | 5/1944 | Honiss | 65—129 |
| 3,015,190 | 1/1962 | Arbeit | 65—347 |

DONALL H. SYLVESTER, *Primary Examiner.*